US011263692B2

(12) United States Patent
Walters et al.

(10) Patent No.: US 11,263,692 B2
(45) Date of Patent: Mar. 1, 2022

(54) CONTROLLING A SPENDING ACCOUNT BASED ON USER SPENDING HABITS

(71) Applicant: Capital One Services, LLC, McLean, VA (US)

(72) Inventors: Austin Walters, Savoy, IL (US); Fardin Abdi Taghi Abad, Champaign, IL (US); Jeremy Goodsitt, Champaign, IL (US); Vincent Pham, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/687,867

(22) Filed: Nov. 19, 2019

(65) Prior Publication Data
US 2021/0150621 A1 May 20, 2021

(51) Int. Cl.
*G06Q 40/02* (2012.01)
*G06Q 20/10* (2012.01)
*G06Q 20/40* (2012.01)

(52) U.S. Cl.
CPC ........... *G06Q 40/02* (2013.01); *G06Q 20/108* (2013.01); *G06Q 20/401* (2013.01)

(58) Field of Classification Search
CPC ............ G06Q 20/35785; G06Q 40/02; G06Q 20/108; G06Q 20/401
See application file for complete search history.

(56) References Cited

U.S. PATENT DOCUMENTS

| 8,112,301 | B2 | 2/2012 | Harvey et al. |
| 8,145,585 | B2* | 3/2012 | Najarian ............... G06Q 40/00 706/45 |
| 9,311,671 | B2 | 4/2016 | Folk et al. |
| 2008/0140569 | A1* | 6/2008 | Handel ............ G06Q 20/35785 705/44 |
| 2015/0170177 | A1 | 6/2015 | Cooke |
| 2016/0379215 | A1* | 12/2016 | Clerkin ................ G06Q 20/20 705/44 |
| 2018/0276541 | A1* | 9/2018 | Studnitzer ............... G06N 3/04 |

(Continued)

OTHER PUBLICATIONS

Nikolic, "Analysis of Financial Time Series in Frequency Domain Using Neural Networks", Intechopen. Apr. 9, 2019. (Year: 2019).*

*Primary Examiner* — Abdulmajeed Aziz
(74) *Attorney, Agent, or Firm* — Banner & Witcoff, Ltd.

(57) ABSTRACT

Aspects described herein may allow for receiving authorization allowing monitoring a user's spending account. A base-line spending profile and a dysfunctional spending profile for the user are established. When notification of a pending purchase transaction is received, a determination is made as to whether the pending purchase transaction is in accordance with the base-line spending profile of the user. If the pending purchase transaction is in accordance with the base-line spending profile of the user, the pending purchase transaction is allowed, however, if the pending purchase transaction is not in accordance with the base-line spending profile of the user, then a temporary secondary approval may be instituted for a predetermined period of time and a secondary approval person is electronically notified that their approval is required before allowing the pending purchase transaction to be made using the spending account of the user.

17 Claims, 8 Drawing Sheets

(56) References Cited

U.S. PATENT DOCUMENTS

2019/0147529 A1* 5/2019 Wright .................. G06Q 40/00
                                                    705/35
2020/0242600 A1* 7/2020 Stack ................ H04W 12/0602

* cited by examiner

CONTROLLING A SPENDING ACCOUNT BASED ON USER SPENDING HABITS

FIELD OF USE

Aspects of the disclosure relate generally to controlling spending by a customer. More specifically, aspects of the disclosure may provide for monitoring and controlling excessive spending that a customer may try to make be due to the customer experiencing a temporary medical, memory, or dysfunctional episode.

BACKGROUND

The use of credit cards for purchasing items and services is ubiquitous in today's society. Typically, when a customer obtains a credit card from a financial institution, the customer is authorized to make purchases using that credit card up to a predetermined limit, such as up to a $10,000 upper limit. Once the customer reaches that limit, the customer must pay down on the credit card balance before being allowed to use the credit card to make additional purchases.

Aspects described herein relate to providing control over credit card or debit card purchases made by a customer, based on information associated with the customer.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for providing control over credit card or debit card purchases attempted to be made by a customer, based on the customer's medical history, such as the customer's past conditions in which the customer experienced a psychotic episode or the like that caused the customer to make excessive purchases using a credit card or a debit card. The control may be such that a secondary authorization may be automatically and temporarily invoked and required for credit card or debit card purchases made by the customer during a period of time when the customer is believed to be experiencing a mental instability condition or other type of condition that may trigger the customer into excessive impulse spending without rational reasoning.

According to some aspects, there may be provided a computer-implemented method that may include receiving authorization for monitoring a spending account of a user. The monitoring may include determining, based on a history of spending activity of the user, a base-line spending profile for the user. It also may include determining, based on the history of spending activity of the user, a dysfunctional spending profile for the user. The method may then designate a secondary approval person who is to provide secondary approval for a purchase to be made by the user using the spending account of the user when the spending activity of the user is not consistent with the base-line spending profile for the user. The method then receives a notification of a pending purchase transaction to be made using the spending account of the user, and a determining, using a prediction model, whether the pending purchase transaction to be made is in accordance with the base-line spending profile of the user. Based on whether the pending purchase transaction to be made is in accordance with the base-line spending profile of the user, if the pending purchase transaction is in accordance with the base-line spending profile of the user, the pending purchase transaction is allowed to be made using the spending account of the user. However, if the pending purchase transaction is not in accordance with the base-line spending profile of the user, then a temporary secondary approval may be instituted for a predetermined period of time and the secondary approval person is electronically notified that their approval is required before allowing the pending purchase transaction to be made using the spending account of the user.

More particularly, some aspects described herein may provide an apparatus having one or more processors, and having memory storing instruction for execution by the one or more processors. The one or more processors may be configured to receive authorization from a user for monitoring a spending account of the user, where the monitoring determines, based on a history of spending activity of the user, a base-line spending profile for the user. It also may determine, based on the history of spending activity of the user, a dysfunctional spending profile for the user. Further, a secondary approval person is designated who is to provide secondary approval for a purchase to be made by the user using the spending account of the user when a spending activity of the user is not consistent with the base-line spending profile for the user. The apparatus receives notification of a pending purchase transaction to be made by the user using the spending account of the user, and then determines, using a neural network model or a Bayesian model, whether the pending purchase transaction to be made is in accordance with the base-line spending profile of the user. Based on whether the pending purchase transaction to be made is in accordance with the base-line spending profile of the user, if the pending purchase transaction is in accordance with the base-line spending profile of the user, the pending purchase transaction is allowed to be made using the spending account of the user. However, if the pending purchase transaction is not in accordance with the base-line spending profile of the user, then a temporary secondary approval process is required by the secondary approval person that may include electronically notifying the secondary approval person that their approval is required before the pending purchase transaction to be made using the spending account of the user is to be allowed.

Corresponding systems and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for controlling a spending account of a customer based on recent purchases made by the customer and based on medical information associated with the customer (as provided by the customer). A neural network and/or Bayesian model may be used to determine a customer's current mental state based on that information. As discussed further herein, this combination of features may allow for ensuring that a customer does not spend over his/her current financial means.

Before discussing these concepts in greater detail, however, several examples of a computing device that may be used in implementing and/or otherwise providing various aspects of the disclosure will first be discussed with respect to FIG. 1.

Figure 1:
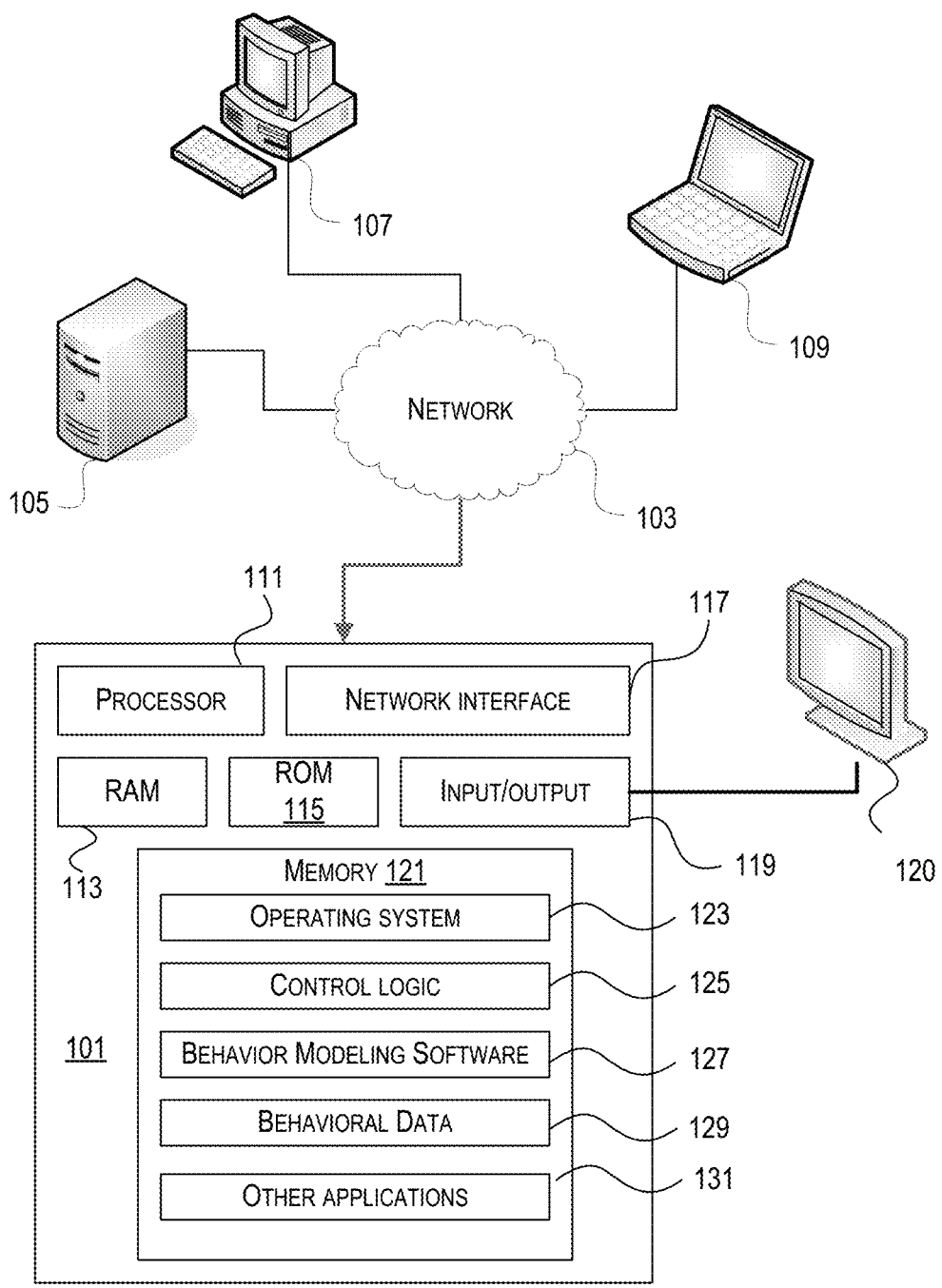
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, behavior modeling software 127, behavioral data 129, and other applications 131. Control logic 125 may be incorporated in and may be a part of behavioral modeling software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for controlling purchases attempted to made by a user with the user's credit card or debit card.

Figure 2:
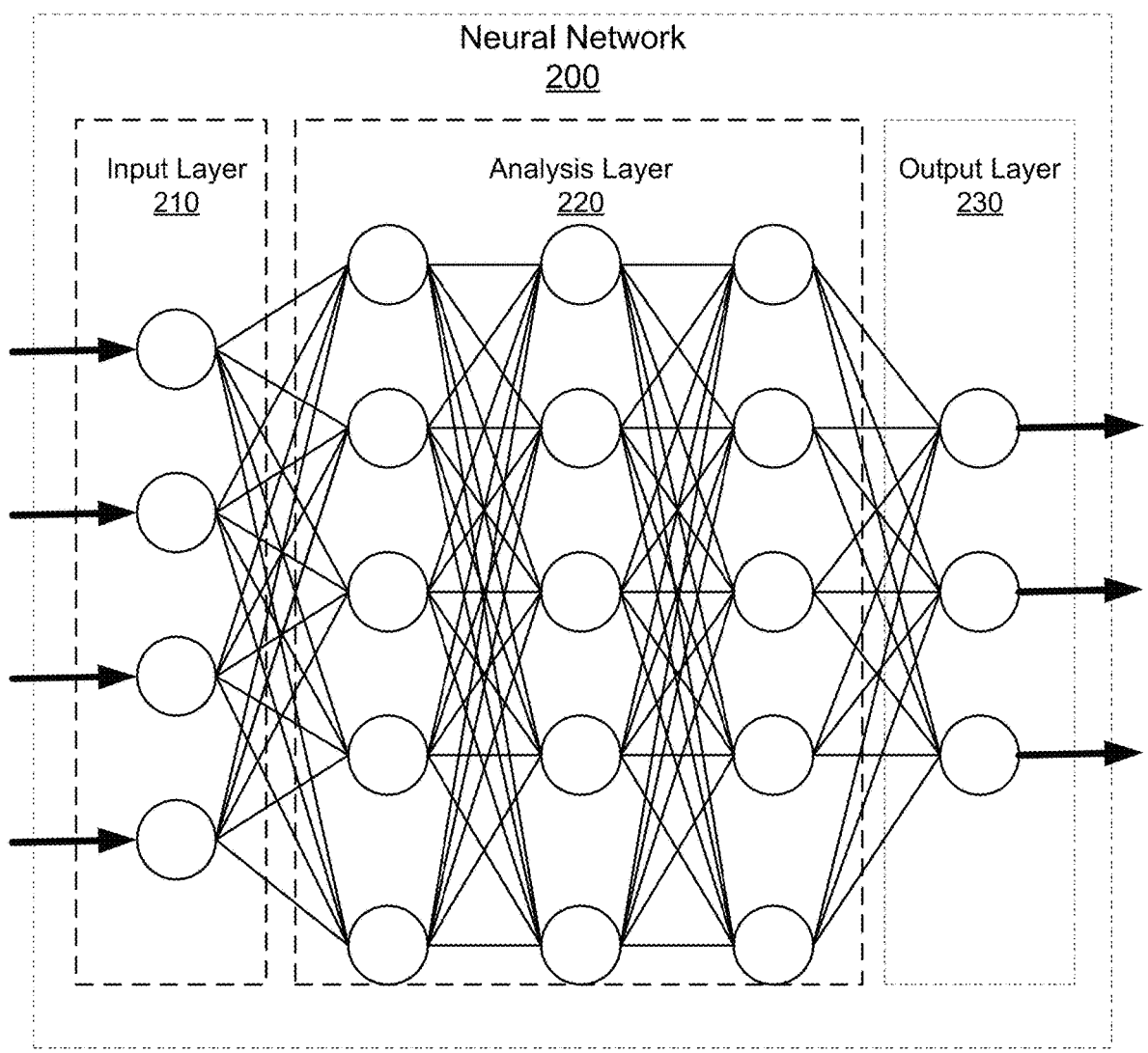
FIG. 2 depicts an example neural network architecture for a model that may determine a user's mental state, according to one or more aspects of the disclosure.

FIG. 2 illustrates an neural network architecture 200 that may be used as a model for determining whether a user is likely experiencing a psychotic, dysfunctional or other type of mental instability episode that may be causing the user to make excessive purchases using his/her credit card or debit card, and which may then result in temporarily controlling purchases made by the user until the model has determined that the user is likely no longer experiencing a psychotic, dysfunctional or other type of mental instability episode. An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others. The artificial neural network illustrated in FIG. 2 is a 3-layer, fully connected model, but the actual implementation is not restricted to just this model, but rather can be any type of neural network design.

An artificial neural network may have an input layer 210, one or more analysis layers 220, and an output layer 230. A neural network, as used herein, may be an artificial network that has more than one hidden layer. Illustrated network architecture 200 is depicted with three analysis layers, and thus may be considered a deep neural network. The number of analysis layers employed in neural network 200 may vary based on the particular application and/or problem domain. For example, a network model used for image recognition may have a different number of hidden layers than a network used for speech recognition. Similarly, the number of input and/or output nodes may vary based on the application. Many types of neural networks are used in practice, such as convolutional neural networks, recurrent neural networks, feed forward neural networks, combinations thereof, and others, which use prior events to predict current and future events. For example, a recurrent neural network may be used to predict the user's current mental state based on purchases made by the user within a particular time period.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

The neural network 200 may be trained based on receipt of information of a user's historical spending habits over a predetermined time period, such as over the past two years. Based on that information, a base-line spending profile may be created for the user, in order to determine when the user may be in a "normal" state. That same historical record can be used to define and determine spending activities where the user substantially deviates from the base-line activity that can be identified as spending while the user is in a "dysfunctional episode state, or in a "ramp up" state to a dysfunctional episode state, or in a "ramp down" state from a dysfunctional episode state. The model, therefore, is intended to identify all three states and treat all as potentially problematic. In another embodiment, the model would identify all three states, but identify the ramp-up state and only treat the "dysfunctional" state as being problematic. By way of example, if the credit card spending made by a user during the past two years is such that the user does not typically spend more than $1000 in any one 30 day window of time, and typically spends between $500 to $1200 in any one 30 day window of time, then that information may be used to determine whether the user is in a normal, non-dysfunctional state or is in a non-normal dysfunctional state during a current 30 day window of time.

In more detail, if the user has spent over $3000 during the past 30 days, then that large amount of spending may operate as a "flag" to indicate that the user may be currently experiencing a dysfunctional episode that may be adversely affecting the spending habits of the user to cause the user to make excessive expenditures over his/her current financial means. This may result in the user's credit card account, bank account, or debit card account being controlled such that a secondary authorization would be required for all further purchases made by the user until it can be determined that the user is no longer experiencing a dysfunctional episode. By way of example, if neural network 200 has determined that the user is currently in a non-normal dysfunctional episode state, then neural network 200 may transition the user from the non-normal dysfunctional episode state to a ramp down state in which the user is getting better mentally and approaching a normal mental state that would no longer require secondary authorization for credit card or debit card purchases. The ramp down state may be entered, for example, when the purchases made by the user while in the non-normal dysfunctional episode state are no longer excessive for the past seven (7) days, such as purchases made over the past 7 days not exceeding $250 for a user who typically spends no more than $1000 per month.

As discussed above, based on purchases made by a user, as well as based on information provided by the user regarding prior dysfunctional or other type of mentally unstable episodes previously experienced by the user, a base-line spending profile may be created for the user, to determine the amount of purchases made by the user when the user is in a normal mental state and when the user is in a non-normal, dysfunctional state. The information regarding the user's prior mentally unstable states may include the start date and end date of each mentally unstable period that the user experienced during the past two years, for example. Based on that information, as well as based on the information on the purchases made by the user with his/her credit card or debit card over the past two years, a spending profile may be generated for the user, to determine whether the user is currently in a normal mental state, a ramp up state in which the user is transitioning from the normal mental state to a dysfunctional mental state, a dysfunctional state in which the user is currently experiencing a dysfunctional episode, or a ramp down state in which the user is transitioning from a dysfunctional state to a normal mental state. A dysfunctional spending profile can then be generated to define the unacceptable spending habits of the user.

The determination as to the current mental state of the user may be determined by a neural network, such as neural network 200 as shown in FIG. 2, or by a Bayesian network, a Markov model or process, or other type of network that can predict a current state of an object (e.g., a person) based on information associated with that object. The spending information provided to the neural network 200 may be the date and amount of each purchase made by a user over the past two years, for example. Alternatively, the spending information may be transformed into the frequency domain, such as using a Fast Fourier Transform (FFT) on the spending information, in order to obtain a power spectrum of the spending, to determine the spending habits for a particular mental state of the user.

In some aspects, spending information of other users in the system, such as other users of a same spending profile as the user in a normal mental state, may be used to determine spending habits of those users when those users are in a normal mental and when those users are in a dysfunctional state. The neural network 200 may use that collective information of the similarly situated users to create a 'base' model that may be modified based on the specific spending habits during normal mental states, e.g., base-line spending profile, and during dysfunctional states, e.g., dysfunctional spending profile, as determined for each particular user.

Figure 3:
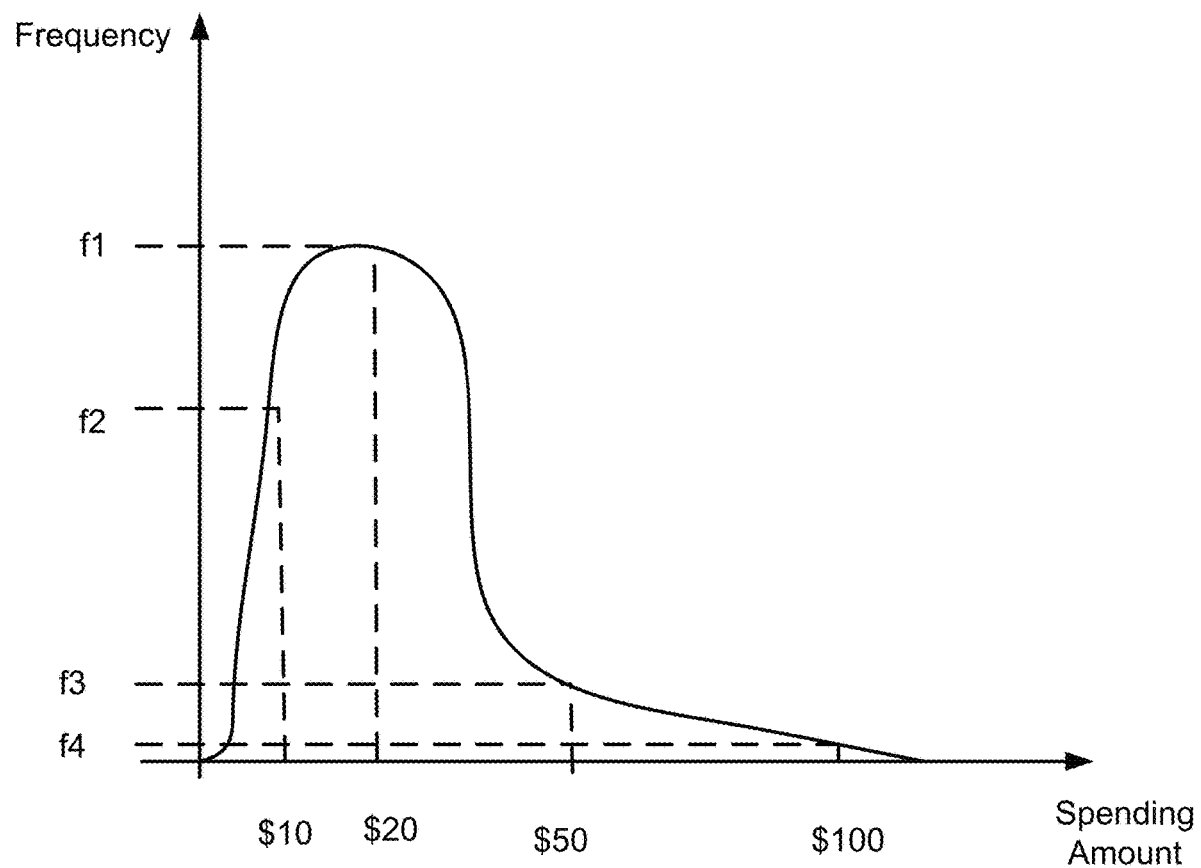
FIG. 3 depicts a frequency versus spending amount Fast Fourier Transform (FFT) plot of a user's spending habits when in a normal mental state, according to one or more aspects of the disclosure.

FIG. 3 illustrates a power spectrum obtained from credit card spending information obtained from a user during a time period when the user was in a normal mental state. As explained above, the user may provide periods of time in the past two years when the user was in a dysfunctional state, and thus other periods of time in the past two years would constitute a normal mental state, a ramp up state, or a ramp down state, of the user. The FFT plot is shown as a two-dimensional plot of frequency versus spending amount, in which the user typically spends somewhere between $10 to $100 for any particular purchase when the user is in a normal mental state, with the most likely single purchase being around $20. The higher the frequency value for a particular spending amount, the higher the likelihood that a purchase made by the user would be that amount. The lesser the frequency value for a particular spending amount, the lower the likelihood that a purchase made by the user would be that amount (thus, it is much less likely that a single purchase made by the user when the user is in the normal mental state would be $100, since f4<<f1).

Figure 4:
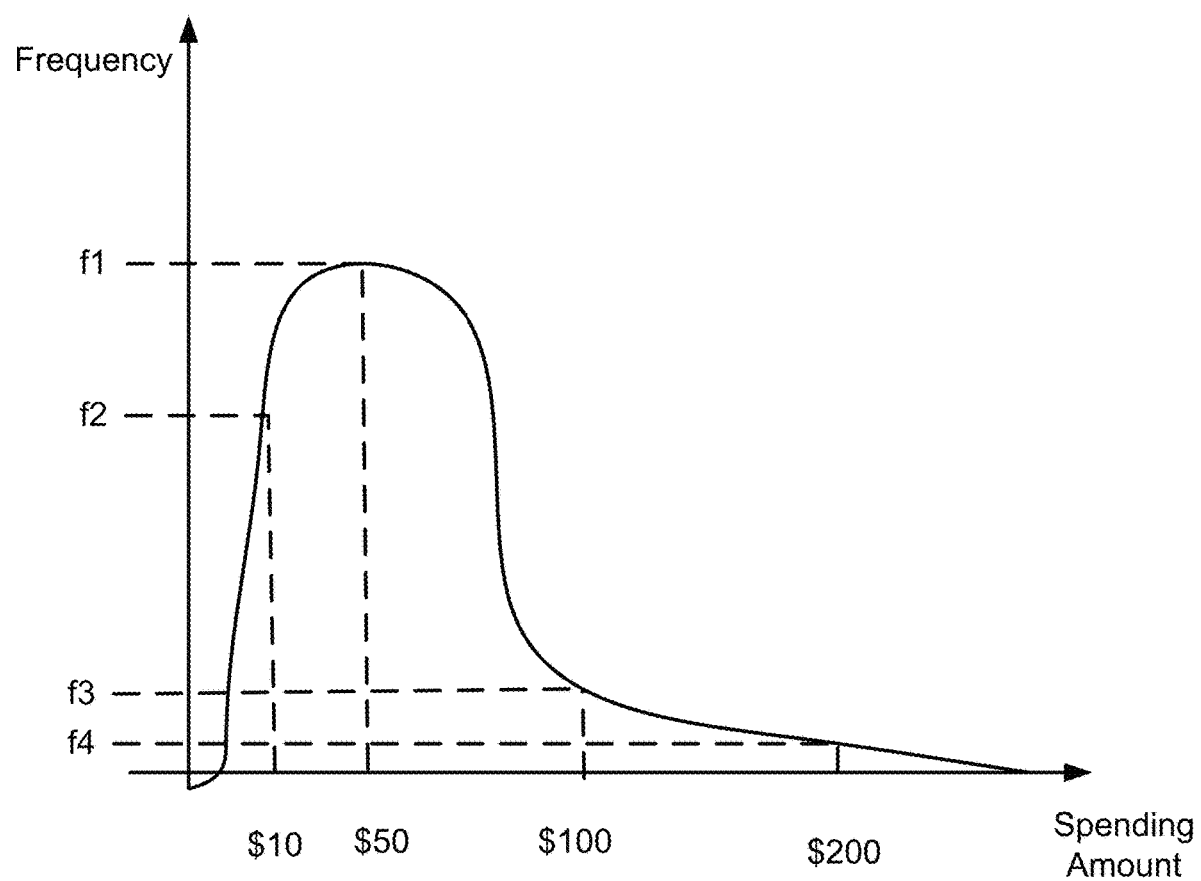
FIG. 4 depicts a frequency versus spending amount FFT plot of a user's spending habits when in a ramp up state from a normal mental state to a dysfunctional state, according to one or more aspects of the disclosure.

FIG. 4 illustrates a power spectrum obtained from credit card spending information obtained from a user during a time period when the user was in a ramp up state that corresponds to a state in which the user is transitioning from the normal mental state to a dysfunctional mental state. As explained above, the user may provide periods of time in the past two years when the user was in a dysfunctional state, and thus periods of time just before each dysfunctional state period, such as the three (3) days before each dysfunctional state period, may be designated as "ramp up" states. During the ramp up states, the user may be showing signs of increased spending as compared to spending made by the user during times when the user is in a normal mental state. By way of example, if the user has spent $150 on credit card purchases on May $10^{th}$, $200 on credit card purchase on May $11^{th}$, and $250 on credit card purchases on May $12^{th}$, this increased spending trend when the user has been determined to be in a normal state may cause neural network to transition the user to a ramp up state.

Continuing with the above example, the plot of FIG. 4 shows an increase in the typical amount of single purchase made by the user with his/her credit card or debit card during the ramp up period, with the typical spending amount being $50 instead of $20 as it was when the user was in the normal mental state. Based on an FFT plot of purchases made by the user within a current time period, as compared to the FFT plot of prior purchases made by the user during times when the user was deemed to be in the ramp up state, the user may be determined to be currently in the ramp up state if the FFT plots substantially match (e.g., are within 90% of each other in spectral shape). In some implementations, spending made by the user with his/her credit card or debit card when in the ramp up state may not require secondary authorization, and in other implementations it may require secondary authorization if the amount to be spent is greater than a predetermined amount, such as greater than 150.

Figure 5:
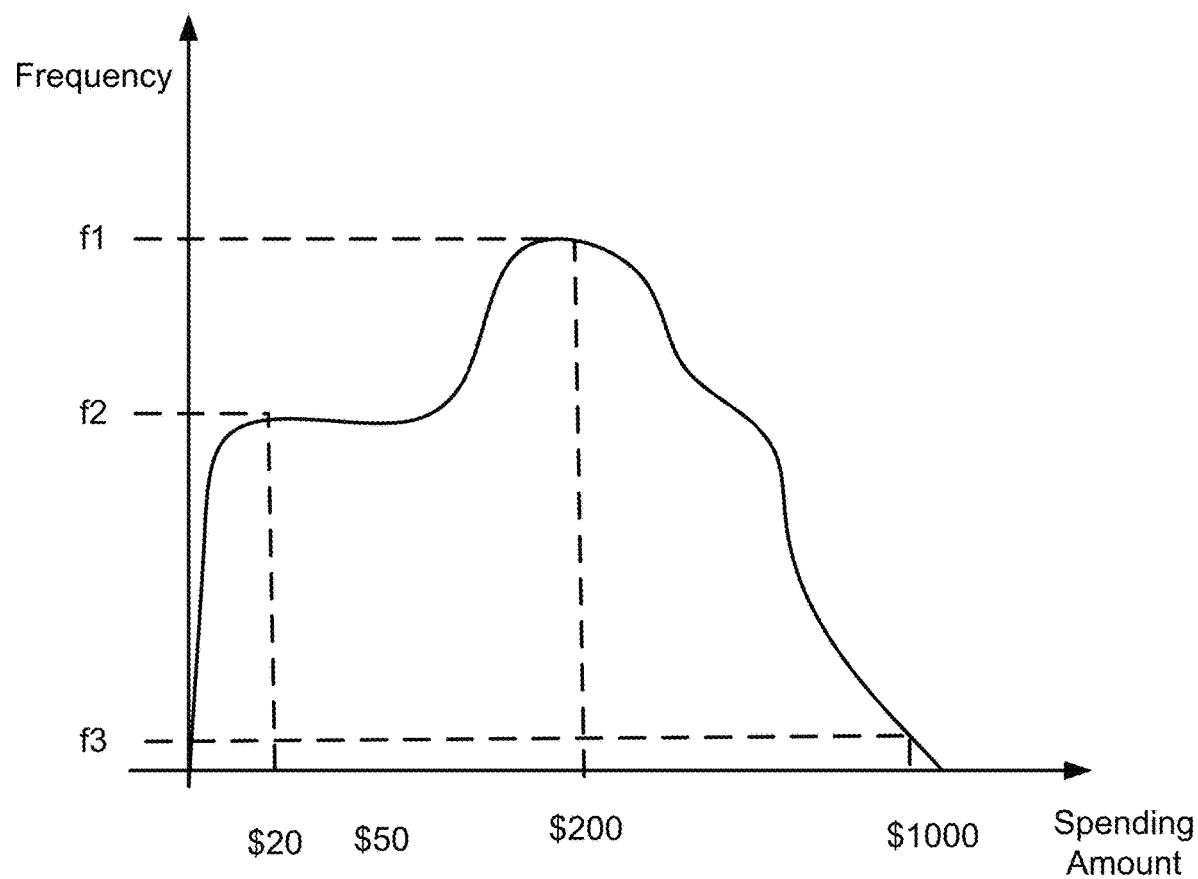
FIG. 5 depicts a frequency versus spending amount FFT plot of a user's spending habits when in a dysfunctional state, according to one or more aspects of the disclosure.

FIG. 5 illustrates a power spectrum obtained from credit card spending information obtained from a user during a time period when the user was in a dysfunctional state, which may be state when the user is experiencing a bi-polar or other type of mentally unstable condition. As explained above, the user may provide periods of time in the past two years when the user was in a dysfunctional state, such as between May $2^{nd}$ and May 15, 2018, and between September $22^{nd}$ and Sep. 30, 2018. During the dysfunctional states, the user may be showing signs of highly excessive spending as compared to spending made by the user during times when the user is in a normal mental state and when the user is in a ramp up state or a ramp down state. Continuing with the above example, the plot of FIG. 5 shows an increase in the typical amount of a single purchase made by the user with his/her credit card or debit card during the dysfunctional period, with the typical spending amount being $200 instead of $20 as when the user was in the normal mental state and the $50 when the user was in the ramp up state. Based on an FFT plot of purchases made by the user within a current time period, as compared to the FFT plot of prior purchases made by the user during times when the user was determined to be in the dysfunctional state, the user may be determined to be currently in the dysfunctional state if the FFT plots substantially match (e.g., are within 90% of each other in spectral shape). When the user is determined to be in the dysfunctional state, all purchases may by the user with his/her credit card or debit card require secondary authorization. Secondary authorization may be made by someone designated by the user to authorize the spending to the made by the user, such as a family member or other trusted person, e.g., a secondary approval person. This designation may be made at the time the user signs up for a credit card or a debit card, or at some other time by the user logging into a particular web site and choosing a secondary authorization option for purchases to be made by the user.

Figure 6:
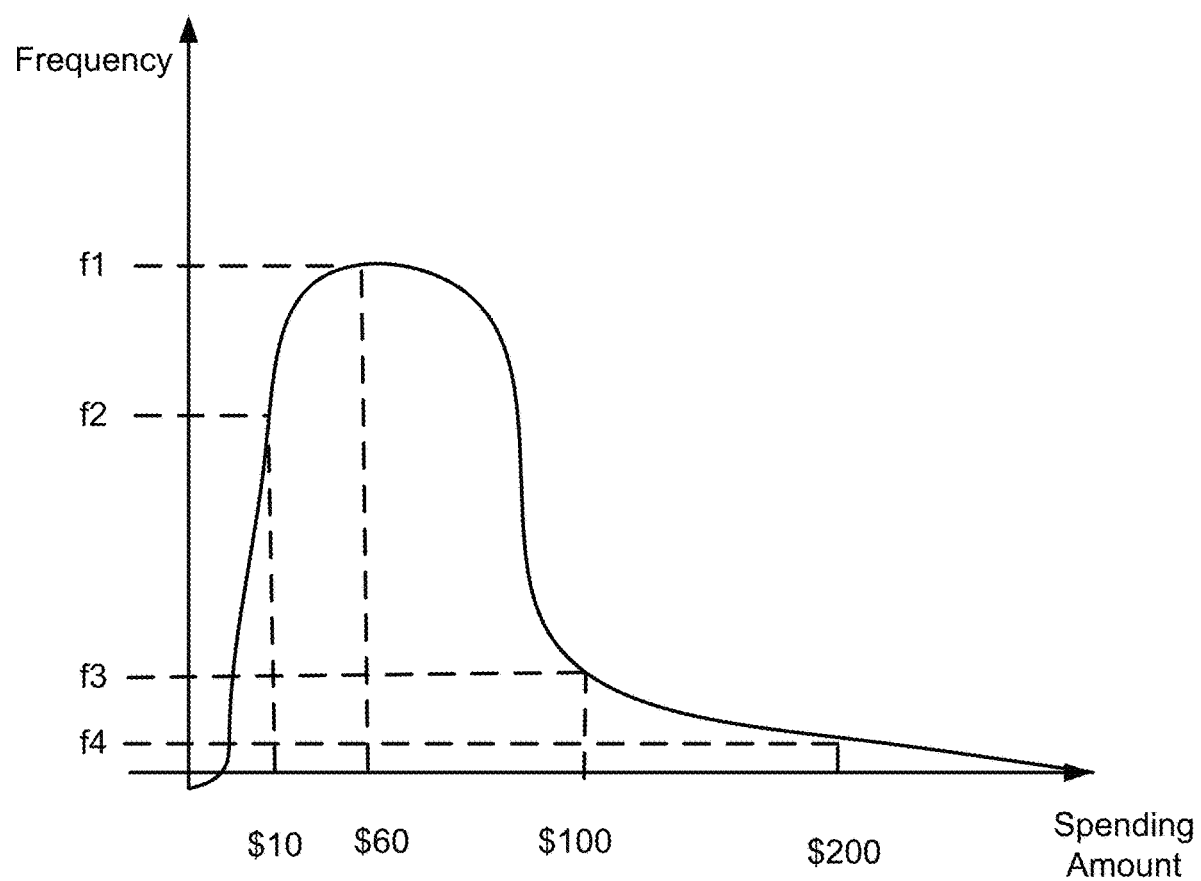
FIG. 6 depicts a frequency versus spending amount FFT plot of a user's spending habits when in a ramp down state from a dysfunctional state to a normal mental state, according to one or more aspects of the disclosure.

FIG. 6 illustrates a power spectrum obtained from credit card spending account information obtained from a user during a time period when the user was in a ramp down state that corresponds to a state in which the user is transitioning from the dysfunctional state to a normal mental state. As explained above, the user may provide periods of time in the past two years when the user was in a dysfunctional state, and thus periods of time just after each dysfunctional state period, such as the three (3) days after each dysfunctional state period, may be designated as "ramp down" states. During the ramp down states, the user may be showing signs of decreased spending as compared to an excessive level of spending made by the user during times when the user is in a dysfunctional state. By way of example, if the user has spent $300 on credit card purchases on May $10^{th}$, $250 on credit card purchase on May $11^{th}$, and $200 on credit card purchases on May $12^{th}$, this decreased spending trend when the user has been determined to be in a dysfunctional state may cause neural network to transition the user to a ramp down state.

Continuing with the above example, the plot of FIG. 6 shows an increase in the typical amount of single purchase made by the user with his/her credit card or debit card during the ramp down period as compared to the normal mental state of FIG. 3 (but it also shows a decrease as compared to the dysfunctional state of FIG. 5), with the typical spending amount being $60 instead of $20 as when the user was in the normal mental state and as opposed to the $200 per purchase made by the user when in a dysfunctional state). Based on an FFT plot of purchases made by the user within a current time period, as compared to the FFT plot of prior purchases made by the user during times when the user was deemed to be in the ramp down state, the user may be determined to be currently in the ramp down state if the FFT plots substantially match (e.g., are within 90% of each other in spectral shape). In some implementations, spending made by the user with his/her credit card or debit card when in the ramp down state may not require secondary authorization, and in other implementations it may require secondary authorization if the amount to be spent is greater than a predetermined amount, such as greater than $150.

In some aspects, the determination as to when the user is in the dysfunctional state and when the user is in the ramp down state may be based in part on the rate at which the secondary authorizations are made. Thus, for example, if the secondary authorizer has approved at least 80% of the last ten purchases to be made by the user when the user was determined to be in the dysfunctional state that requires secondary authorization, that information may be used to cause the neural network 200 to change the user's state to the ramp down state, since the high approval rate by the secondary authorizer is indicative that the secondary authorizer believes that the purchases to be made by the user are legitimate and are not due to a dysfunctional state of mind. A first weight value may be applied by the neural network 200 to the rate of approval of secondary authorizations, and a second weight value may be applied by the neural network 200 to the number and the amount of purchases made by the user when in the dysfunctional state, to be used to determine when to transition the user from the dysfunctional state to the ramp down state.

The FFT plots of FIGS. 3, 4, 5 and 6 are shown as two-dimensional plots of frequency versus spending amount, whereby these plots may alternatively be three-dimensional plots of frequency versus spending amount versus time (frequency plots), in which the amount of time that user is in a particular mental state may also be used to determine the likelihood that the user's current purchases are indicative of a normal mental state, a ramp up state, a dysfunctional state, or a ramp down state. To obtain a three-dimensional FFT plot, a two-dimensional FFT plot of purchase amount and two-dimensional FFT plot of purchase time may be combined to obtain a three-dimensional FFT plot of time, spending rate, and spending amount as the three dimensions.

In some aspects, when the user requests secondary authorization be done by the credit card company on his/her spending account, the user may be queried by the credit card company about whether unusual credit card purchase patterns by the user in the past were due to dysfunctional or other type of mental instability of the user. If so, the purchases made during those times identified by the user as being a dysfunctional episode may be used by the neural network 200 to determine the user's current mental state based on input corresponding to purchases recently made and purchases attempted to be made by the user.

Figure 7:
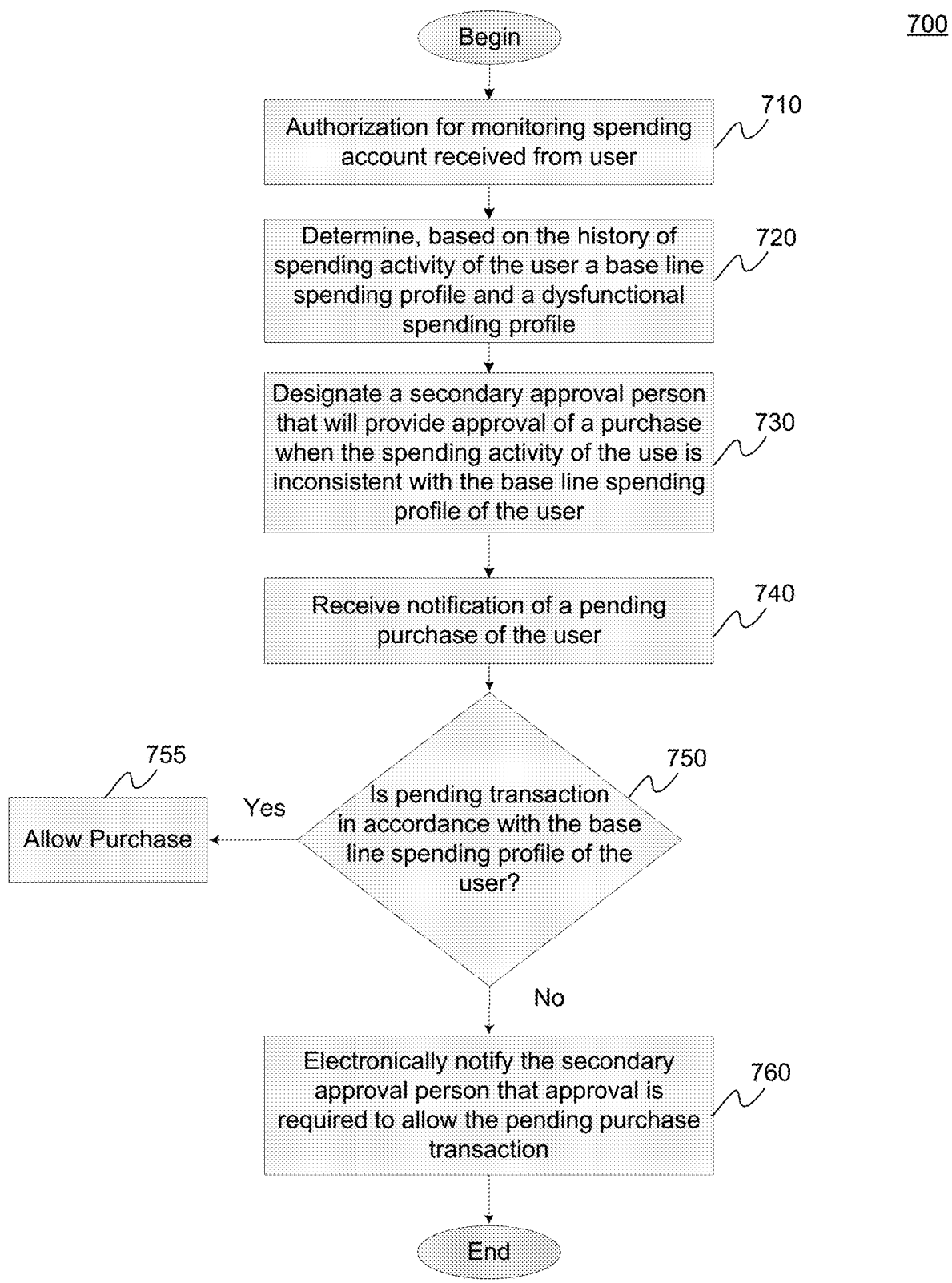
FIG. 7 depicts a flow chart for a method of controlling a user's spending account, according to one or more aspects of the disclosure.

FIG. 7 illustrates a flow diagram of a method 700 of monitoring and controlling purchases made with a user's credit card or debit card account according to one or more aspects. In step 710, input, i.e., authorization, is received from a user, in which the user grants authorization to one of more individuals to have his/her spending account monitored and controlled under certain circumstances, such as when the user is determined to be in a dysfunctional mental state.

In step 720, the user's history of spending activity is used to determine a base-line spending profile. The base-line spending profile is used to compare against future purchase patterns to determine if the user's behavior is in line with "normal" purchases. In addition, the user's history of spending activity is analyzed to identify the spending patterns of the user during a dysfunctional period. Such an analysis could provide particular non-normal patterns of purchases, the amounts associated with those purchases, and the duration of such purchases. As explained above, purchases made by the user during the past two or three years may be monitored and stored in a database.

In addition, the spending habits of the user are determined for the user based on past purchases made by the user using the spending account to determine a base-line "normal" state, a "dysfunctional" state and intermediate ramp-up and ramp-down states. As explained above, the spending habits, or spending profile, of the user may be determined by a neural network, Bayesian network, or other type of artificial intelligence network that may be used to predict a current state of a user based on purchases made by the user over a predetermined time period. Also, as explained above, FFT analysis may be used to obtain a power spectrum associate with the spending habits. Also, as explained above, the spending habits may be categorized as "normal state" spending habits, "ramp up state" spending habits, "dysfunctional state" spending habits, or "ramp down state" spending habits, based on information provided by the user regarding times when the user had experienced a dysfunctional episode in the past.

In step 730, one or more persons are designated as a secondary approval person. The secondary approval person will be required to intervene and grant their approval for a purchase transaction when the user's spending activity appears to be inconsistent with the base-line spending profile that was constructed to indicate a normal state of spending activity.

In step 740, the monitoring detects a pending purchase transaction is being attempted by the user using his/her credit card account, bank account, or debit card account.

In step 750, the pending transaction is analyzed, such as by the neural network 200 of FIG. 2, as to the current state of the user based on the pending purchase transaction attempted by the user and recent purchases made by the user (e.g., purchases made by the user within the past 7 days). The current state may be: 1) normal mental state, 2) ramp up state, 3) dysfunctional mental state, or 4) ramp down state. If the pending purchase is consistent with the base-line spending profile, then at step 755 the purchase is allowed. Also, if the user is determined to be in a ramp up or ramp down state, the purchase does not trigger an approval by the secondary approval person. However, if the pending purchase is inconsistent with the base-line spending profile, then step 750 fails and the secondary approval person must be notified that their approval is necessary to proceed with the purchase.

In step 760, when a temporary secondary approval is needed to authorize a purchase transaction, the secondary approval person is electronically notified that their approval is required to allow the pending purchase transaction to proceed.

Secondary approval, when required, may be obtained in a variety of ways, such as via a text or email, or a push notification to a designated telephone number or Uniform Resource Locator (URL) address associated with the secondary approval person as provided by the user when the user initially signed up for secondary authorization. A predetermined code may be required to be provided by the person receiving the text or email, in order to authorize the purchase to be made by the user. For example, the secondary approval person may enter a first code such as "1263" as a code that authorizes the purchase, and the secondary approval person may enter a second code such as "3632" as a code that does not authorize the purchase. In other possible implementations, the secondary authorizer may be telephoned using a telephone number provided by the user of the credit card or debit card at the time of registration, whereby the secondary authorizer verbally authorizes or does not authorize the current purchase that they user is attempting to make. Thus, the secondary approval person would receive notification of a pending purchase transaction by the user and would generate a response to the notification either allowing or disallowing the pending purchase transaction.

In some aspects, where the user is not able to provide detailed information as to prior dysfunctional episodes, a default time period, such as two weeks, may be used as the "dysfunctional state" time period. Accordingly, once the neural network 200 determines based on recent purchases that the user has entered a dysfunctional state, the user is determined to stay in the dysfunctional state for the next two weeks, irrespective as to purchases made by the user during that time.

In some aspects, based on the type and frequency of purchases made the user over a period of time, the user may be determined to be in a particular state, such as the dysfunctional state, even when each purchase is not large. This may occur, for example, when the user has made many purchases of the same or a similar item in a short time period, such as buying twenty pairs of shoes from an online shoe store within a one week time period. This may be flagged by the neural network 200, and even though the total amount of those purchases being less than a predetermined amount would not by itself cause the neural network 200 to transition the user to the dysfunctional state, this unusual recent purchase history may cause the neural network 200 to determine that the user has entered the dysfunctional state. Thus, neural network 200 can correlate at least one period of time when the user experienced a dysfunctional state or episode with a specific purchase. In this manner, a set of rules may be created and used by the model, that being the neural network 200, to determine alternative ways to categorize the current mental state of the user. For example, one rule may be to cause the user to enter the dysfunctional state when purchases of a same type of item have been made at least five times within a two day or less time period, and another rule may be to cause the user to enter the dysfunctional state when purchases of at least three types of items (e.g., canary food from an online pet store, a swing set, and a cuckoo clock) that have never been purchased before by the user using his/her credit card or debit card have been made within a two day time period.

Figure 8:
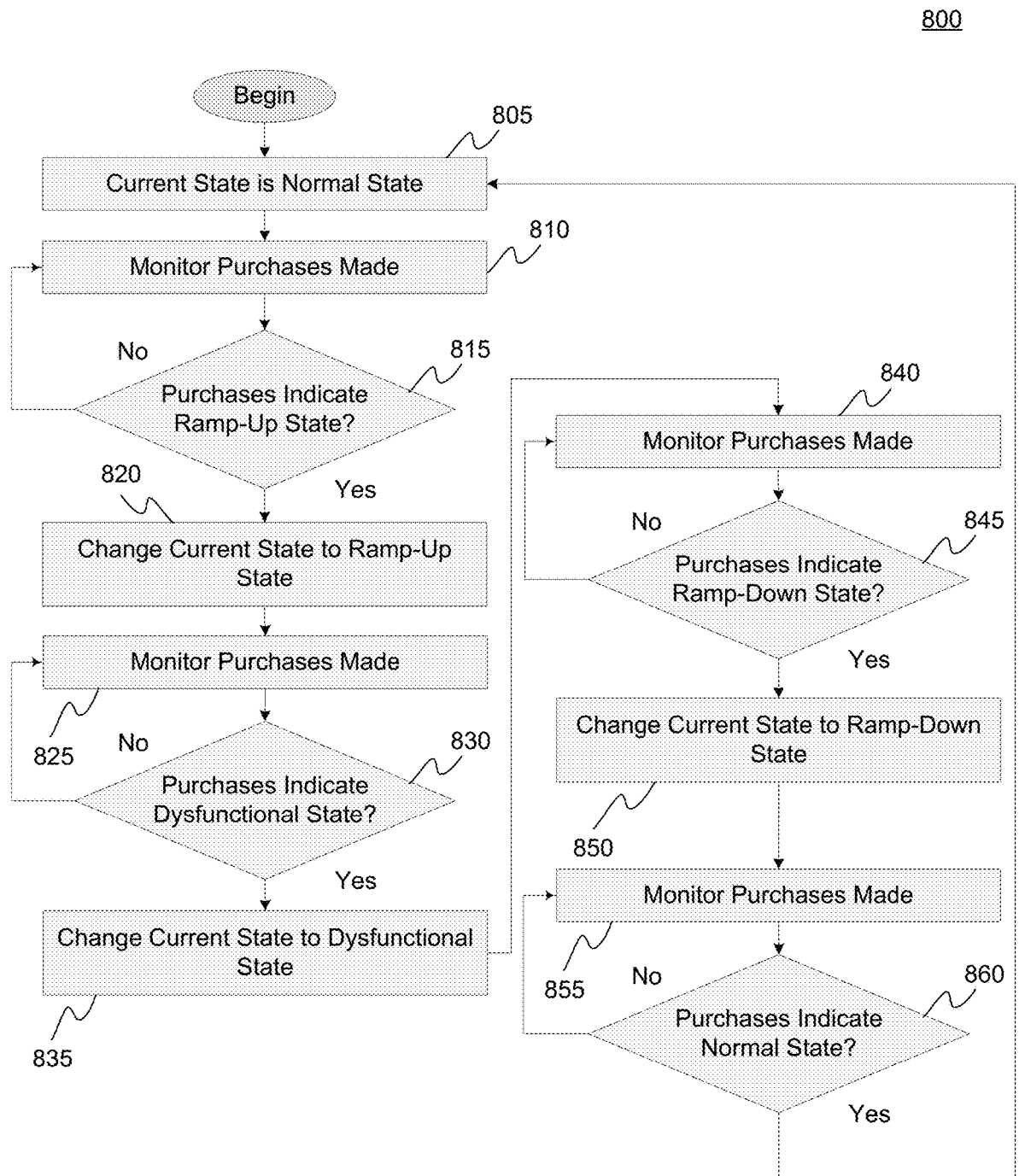
FIG. 8 depicts a flow chart for a method used by a neural network model to determine a user's current mental state based on purchases made by the user, according to one or more aspects of the disclosure.

FIG. 8 depicts a flow chart for a method 800 used by a neural network model to determine a user's current mental state based on purchases made by the user, according to one or more aspects of the disclosure. In step 805, the method starts by assuming that the current state of the user is a normal state. In step 810, purchases made by the user with his/her credit card or debit card are monitored. If the purchases are indicative of a ramp up state based on a determination made in step 815, such as purchases closely matching the FFT plot of FIG. 4, then the method proceeds to step 820 in which the current state is changed to the ramp up state. Alternatively, a determination could be made at step 815 that purchases are indicative of a normal state, as shown in FIG. 3, in which case the purchases are not indicative of a ramp up state, and the method returns to step 810 to monitor purchases while in the normal state.

If the current state is determined to be the ramp up state (Yes determination in step 815), then purchases made while in the ramp up state are monitored in step 825. If the purchases made while in the ramp up state are indicative of a dysfunctional state based on a determination made in step 830, such as purchases closely matching the FFT plot of FIG. 5, then the method proceeds to step 835 in which the current state is changed to the dysfunctional state. If the purchases are not indicative of a dysfunctional state, then the method returns to step 825 to monitor purchases while in the ramp up state. Alternatively, a determination could be made at step 830 that purchases are indicative of a normal state, as shown in FIG. 3, in which case the method would return to step 810 to monitor purchases while in the normal state.

If the current state is determined to be dysfunctional state (Yes determination in step 830), then purchases made while in the dysfunctional state are monitored in step 840. If the purchases made while in the dysfunctional state are indicative of a ramp down state based on a determination made in step 845, such as purchases closely matching the FFT plot of FIG. 6, then the method proceeds to step 850 in which the current state is changed to the ramp down state. If the purchases are not indicative of a ramp down state, then the method returns to step 840 to monitor purchases while in the dysfunctional state.

If the current state is determined to be the ramp down state (Yes determination in step 845), then purchases made while in the ramp down state are monitored in step 855. If the purchases made while in the ramp down state are indicative of a normal state, such as purchases closely matching the FFT plot of FIG. 3, then the method returns to step 805 in which the current state is changed to the normal state. If the purchases are not indicative of a normal state, then the method returns to step 855 to monitor purchases while in the ramp down state.

Some aspects may involve training the neural network 200 or other type of model used to determine the user's current mental state based on recent purchases made by the user with his/her credit card or debit card. This may be accomplished using credit card or debit card purchase information of other users who were known to be in a dysfunctional state when those purchases were made, along with purchases made by the user himself/herself when the user identified that he/she was in a dysfunctional state at the time those purchases were made. In any event, the privacy of all parties would be kept confidential and would not be made available to any particular user.

Although the subject matter has been described in language specific to structural features and/or methodological acts, it is to be understood that the subject matter defined in the appended claims is not necessarily limited to the specific features or acts described above. For example, a time period requiring secondary authorization may not necessarily be due to a dysfunctional episode being experienced by the customer, but rather some stressful situation at work or at home that has caused the customer to excessively spend with his/her credit card and/or debit card. Also, spending attempted to be made using a credit card or debit card during the ramp up and ramp down periods may require a secondary authorization if the amount to be spent exceeds a particular threshold amount, such as $200 or greater. Also, other events may be used to cause the model to transition the customer to the dysfunctional state, such as applications by the customer for two or more credit card accounts within a short time period (e.g., within a two day period). Rather, the specific features and acts described above are disclosed as example forms of implementing the claims.

What is claimed is:

1. A computer-implemented method for controlling a spending account of a user during a dysfunctional mental episode, the computer-implemented method comprising:
   receiving, by a computing device, authorization for monitoring the spending account of the user;
   determining, by the computing device and based on historical data representing a history of spending activity of the user during a first time period associated with a normal mental state of mind of the user, a base-line spending profile for the user;
   determining, by the computing device and based on historical data representing a history of spending activity of the user during a second time period associated with a dysfunctional mental state of mind of the user, a dysfunctional spending profile for the user, wherein an overall purchase amount, made by the user during the first time period, is lower than an overall purchase amount, made by the user during the second time period, and wherein the determining the base-line spending profile and the dysfunctional spending profile comprises creating a frequency plot of the history of spending activity of the user by performing a fast fourier transform (FFT) analysis of the history of spending activity for the user;
   training, using the base-line spending profile for the user and using the dysfunctional spending profile for the user, a neural network model to predict whether the user is in the normal mental state of mind or the dysfunctional mental state of mind when making a purchase, wherein the training comprises:
      initiating the neural network model that comprises a plurality of nodes, each having an assigned weight used to generate predictions, wherein the initiating comprises setting initial values for the assigned weights; and
      iteratively adjusting, using stochastic gradient descent algorithms, and based on training data comprising the base-line spending profile and the dysfunctional spending profile, the assigned weights for the plurality of nodes of the neural network model to improve accuracy of the predictions;
   receiving a notification of a pending purchase transaction to be made using the spending account of the user;
   creating, based on the frequency plot, a purchase amount range of the user for when the user is determined to not be experiencing the dysfunctional mental episode corresponding to the dysfunctional mental state of mind;
   determining that an amount of the pending purchase transaction exceeds the base-line spending profile when the amount of the pending purchase transaction exceeds the purchase amount range by at least a predetermined amount;
   determining, by the computing device, using the neural network model, and based on the amount of the pending purchase transaction exceeding the purchase amount range by at least the predetermined amount, that a secondary approval of the pending purchase transaction is required;
   based on the determining that the secondary approval is required, automatically instituting, by the neural network model, a temporary secondary approval for a predetermined period of time; and
   sending, based on the instituting, an electronic notification to a secondary approval person that the temporary secondary approval is required before allowing the pending purchase transaction to be made using the spending account of the user.

2. The computer-implemented method of claim 1, further comprising:
   receiving a second notification of a second pending purchase transaction to be made using the spending account of the user; and
   based on determining, using the neural network model, that the secondary approval is not required for the second pending purchase transaction, allowing the second pending purchase transaction to be made using the spending account of the user.

3. The computer-implemented method of claim 1, wherein the determining the dysfunctional spending profile further comprises:
   correlating the second time period with a purchase previously made by the user.

4. The computer-implemented method of claim 1, wherein the determining the base-line spending profile and the dysfunctional spending profile comprises:
   determining a spending habit using the spending account of the user during the second time period in which the user was determined to be experiencing the dysfunctional mental episode, and during the first time period in which the user was determined to not be experiencing the dysfunctional mental episode.

5. The computer-implemented method of claim 1, further comprising:
   terminating the temporary secondary approval based on spending activity of the user indicating the base-line spending profile.

6. The computer-implemented method of claim 1, further comprising:
   determining, by the computing device, using the neural network model, and based on historical data representing a history of spending activity of the user during one or more other time periods, one or more transition profiles between the base-line spending profile and the dysfunctional spending profile,
   wherein a respective most frequent purchase amount, made by the user and corresponding to the one or more other time periods, is higher than a most frequent purchase amount made by the user during the first time period and is lower than a most frequent purchase amount made by the user during the second time period.

7. The computer-implemented method of claim 1, wherein the predetermined amount by which the amount of the pending purchase transaction exceeds the purchase amount range corresponds to 50% or more than an upper limit of the purchase amount range.

8. An apparatus for controlling a spending account of a user during a dysfunctional mental episode, the apparatus comprising:
 one or more processors; and
 memory storing instructions that, when executed by the one or more processors, cause the apparatus to:
  receive authorization from the user for monitoring the spending account of the user;
  train a neural network model that comprises a plurality of nodes, each having an assigned weight used to generate predictions, wherein the training comprises:
   initiating the neural network model by setting initial values for the assigned weights; and
   iteratively adjusting, using stochastic gradient descent algorithms, and based on training data comprising one or more base-line spending profiles, each representing a history of spending activity associated with a normal mental state of mind of a particular training user, and one or more dysfunctional spending profiles, each representing a history of spending activity associated with a dysfunctional mental state of mind of the particular training user, the assigned weights for the plurality of nodes of the neural network model to improve accuracy of the predictions;
  determine, based on historical data representing a history of spending activity of the user during a first time period associated with a normal mental state of mind of the user, a base-line spending profile for the user;
  determine, based on historical data representing a history of spending activity of the user during a second time period associated with a dysfunctional mental state of mind of the user, a dysfunctional spending profile for the user, wherein an overall purchase amount, made by the user during the first time period, is lower than an overall purchase amount, made by the user during the second time period, and wherein the instructions cause the apparatus to determine the base-line spending profile and the dysfunctional spending profile by causing the apparatus to:
   perform a fast fourier transform (FFT) analysis of the history of spending activity of the user; and
   create a frequency plot of the history of spending activity of the user based on the FFT analysis;
  receive a notification of a pending purchase transaction to be made by the user using the spending account of the user;
  create, based on the frequency plot, a typical purchase amount range of the user for when the user is determined to not be experiencing a dysfunctional mental episode;
  determine that an amount of the pending purchase transaction exceeds the base-line spending profile of the user when the amount of the pending purchase transaction exceeds the typical purchase amount range by at least a predetermined amount;
  determine, using the neural network model, and based on the amount of the pending purchase transaction exceeding the typical purchase amount range by at least the predetermined amount, that a secondary approval of the pending purchase transaction is required;
  based on the determining that the secondary approval is required, automatically institute, by the neural network model, a temporary secondary approval by a secondary approval person, and
  send, based on the instituting, an electronic notification to the secondary approval person that the temporary secondary approval is required before allowing the pending purchase transaction to be made using the spending account of the user.

9. The apparatus of claim 8, wherein the neural network model comprises a recurrent neural network that includes a plurality of analysis layers.

10. The apparatus of claim 8, wherein the instructions further cause the apparatus to:
 determine the dysfunctional spending profile by correlating the second time period with a purchase previously made by the user.

11. The apparatus of claim 8, wherein the instructions further cause the apparatus to:
 determine the base-line spending profile and the dysfunctional spending profile by determining a spending habit of the user during the second time period in which the user was determined to be experiencing the dysfunctional mental episode, and during the first time period in which the user was determined to not be experiencing the dysfunctional mental episode.

12. The apparatus of claim 8, wherein the instructions, when executed by the one or more processors, further cause the apparatus to:
 terminate the temporary secondary approval based on the history of spending activity of the user indicating the base-line spending profile.

13. The apparatus of claim 8, wherein the instructions, when executed by the one or more processors, further cause the apparatus to:
 determine, using the neural network model, and based on historical data representing a history of spending activity of the user during one or more other time periods, one or more transition profiles between the base-line spending profile and the dysfunctional spending profile, wherein a respective most frequent purchase amount, made by the user and corresponding to the one or more other time periods, is higher than a most frequent purchase amount made by the user during the first time period and is lower than a most frequent purchase amount made by the user during the second time period.

14. One or more non-transitory computer readable media storing instructions for controlling a spending account of a user during a dysfunctional mental episode that, when executed by one or more processors, cause the one or more processors to perform steps comprising:
 receiving an authorization from the user for monitoring a credit card spending account of the user or a bank account of the user;
 identifying at least one time period when the user was in a dysfunctional mental state of mind;
 designating a secondary approval person, by the user, to provide secondary approval for a purchase to be made by the user using the credit card spending account of the user or the bank account of the user;

monitoring purchases made using the credit card spending account of the user or the bank account of the user;

determining, based on the monitored purchases, a base-line spending profile of the user during a time period when the user was in a normal mental state of mind;

determining, based on the monitored purchases, a dysfunctional spending profile of the user during the at least one time period when the user was in the dysfunctional mental state of mind, wherein an overall purchase amount, made by the user during the time period when the user was in the normal mental state of mind, is lower than an overall purchase amount, made by the user during the at least one time period when the user was in the dysfunctional mental state of mind, and wherein the determining the base-line spending profile and the dysfunctional spending profile comprises:
  performing a fast fourier transform (FFT) analysis of the monitored purchases; and
  creating a frequency plot of the monitored purchases based on the FFT analysis;

training, using the base-line spending profile for the user and using the dysfunctional spending profile for the user, a neural network model to predict whether the user is in the normal mental state of mind or the dysfunctional mental state of mind when making a purchase, wherein the training comprises:
  initiating the neural network model that comprises a plurality of nodes, each having an assigned weight used to generate predictions, wherein the initiating comprises setting initial values for the assigned weights; and
  iteratively adjusting, using stochastic gradient descent algorithms, and based on training data comprising a second base-line spending profile representing a history of spending activity associated with a normal mental state of mind of a particular training user and a second dysfunctional spending profile representing a history of spending activity associated with a dysfunctional mental state of mind of the particular training user, the assigned weights for the plurality of nodes of the neural network model to improve accuracy of the predictions;

receiving a notification of a pending purchase transaction to be made by the user using the credit card spending account of the user or the bank account of the user;

creating, based on the frequency plot, a purchase amount range of the user for when the user is determined to not be experiencing the dysfunctional mental episode corresponding to the dysfunctional mental state of mind;

determining that an amount of the pending purchase transaction exceeds the base-line spending profile for the user when the amount of the pending purchase transaction exceeds the purchase amount range by at least a predetermined amount;

determining, using the neural network model, and based on the amount of the pending purchase transaction exceeding the purchase amount range by at least the predetermined amount, that a secondary approval of the pending purchase transaction is required;

based on the determining that the secondary approval is required, automatically instituting, by the neural network model, a temporary secondary approval for a predetermined period of time; and sending, based on the instituting, an electronic notification to a secondary approval person that the temporary secondary approval is required before allowing the pending purchase transaction to be made using the credit card spending account of the user or the bank account of the user.

15. The one or more non-transitory computer readable media of claim 14, wherein the instructions, when executed by the one or more processors, further cause the one or more processors to perform steps comprising:
  receiving a second notification of a second pending purchase transaction to be made using the credit card spending account of the user or the bank account of the user; and
  based on determining, using the neural network model, that the secondary approval is not required for the second pending purchase transaction, allowing the second pending purchase transaction to be made using the credit card spending account of the user or the bank account of the user.

16. The one or more non-transitory computer readable media of claim 14, wherein the instructions, when executed by the one or more processors, further cause the one or more processors to determine the dysfunctional spending profile for the user by performing steps comprising:
  correlating the at least one time period when the user was in the dysfunctional mental state of mind with a purchase previously made by the user.

17. The one or more non-transitory computer readable media of claim 14, wherein the instructions, when executed by the one or more processors, further cause the one or more processors to perform steps comprising:
  based on determining that spending activity of the user corresponds to the base-line spending profile for the user, determining that the temporary secondary approval for the pending purchase transaction is no longer required.

* * * * *